UNITED STATES PATENT OFFICE.

JOHN H. STEVENS, OF NEWARK, NEW JERSEY, ASSIGNOR TO THE CELLULOID MANUFACTURING COMPANY, OF NEW YORK, N. Y.

MANUFACTURE OF MATERIAL TO IMITATE IVORY FROM PYROXYLINE COMPOUNDS.

SPECIFICATION forming part of Letters Patent No. 300,158, dated June 10, 1884.

Application filed April 5, 1884. (No specimens.)

*To all whom it may concern:*

Be it known that I, JOHN H. STEVENS, a citizen of the United States, and a resident of Newark, in the county of Essex and State of New Jersey, have invented certain new and useful Improvements in the Manufacture of Material to Imitate Ivory from Pyroxyline Compounds, of which the following is a specification.

The invention relates to improvements in the manufacture of material to imitate ivory from pyroxyline compounds; and it consists in certain novel processes, hereinafter described, whereby a regular, uniform, and strong sheet of material in imitation of ivory is produced, and one having other qualities which have not been attained in the art as heretofore practiced.

I will first briefly describe the process of making the sheets of material in imitation of ivory, as practiced heretofore, and then point out distinctly my present invention, with its advantages and the results attained.

The material, in a batch of a nature suitable to be rolled into sheets, is passed between heated rolls and formed into sheets in the well-known manner. Two separate batches of the material, each colored so as to resemble the colors of ivory, are thus formed into sheets of about one-sixteenth of an inch thick, a number of the sheets placed in face-to-face contact and pressed together and compacted by being passed between heated rolls. The slab produced in this manner, will of course vary in size according to circumstances. It is merely necessary that it be of such a size that it can be easily cut into strips of a convenient shape to be afterward formed into a solid block, as hereinafter described. The slab is about one inch thick, and is composed of sheets of material alternating in color, firmly compacted into a substantially solid mass. This slab is cut into strips of any convenient width, according to the thickness desired in the final block of material. The strips are placed on their edges in face-to-face contact, and held together by means of a suitable clamping-frame until a sufficient number have been accumulated, after which they are subjected to the action of a press—such as that, for illustration, described and claimed in Letters Patent of the United States numbered 199,908—whereby they are formed into a solid block, from which sheets in imitation of ivory may be planed. The main feature of the invention sought to be protected hereby relates to the treatment of the strips with a solvent previous to their formation into a homogeneous block by the press. Without the solvent, the strips, whether they are composed of one or many sheets each, do not perfectly weld together, and the result is not uniform, but is defective in many particulars, which is due, first, to the difficulties attending the attempt to unite two pieces of pyroxyline material when of the necessary stiffness to be cut into sheets, and especially of such a material as that here treated of, where the methods of handling are so different from those ordinarily pursued; and, second, to the fact that when the strips are cut a certain amount of the solvent is evaporated before they can be suitably arranged and subjected to the action of the press. This evaporation is not uniform throughout the strips, but affects their edges and side surfaces in a far greater degree than their interior; hence from these two causes, in the welding of the strips to form the final block (without treatment with a solvent) and its subsequent reduction to sheets, much difficulty will be experienced. For example, the sheets cut from the slab will have an undulatory surface, and will be traversed by lines of harder material than those portions between the lines; hence are liable to break on these lines. The sheets, although when freshly cut may appear to be strong, yet are liable to break more easily at the points of junction when seasoned. The hard lines or streaks traversing the sheets are due to the evaporation from the edges and surfaces of the strips, as above described, and the irregular surface of the sheets arises from the fact that the interior of the strips, being soft, is not affected by the cutting-knife during the process of sheeting, like the partially hardened edges thereof. The lack of uniformity in the final block and the correction of the consequent embarrassments to the production of a perfect result, are the purposes of my present invention; and these I accomplish in a most effectual and satisfactory manner by imparting to the strips, prior to their subjection to the press, a suitable amount of liquid solvent as near as possible equivalent to that which has been evaporated from them. For instance, after said strips have been cut and are being arranged for the press, I quickly brush over each of them an appropriate amount of solvent—such as wood-alcohol—to compensate for the evaporation and to restore them to the condition they were in when first cut from the slab. The strips thus treated and restored are, immediately before the freshly-applied solvent has been either absorbed or evaporated, and while still wet, placed together, edge upward, in a suitable clamping-frame, and so welded together. This operation forms the strips into a solid mass or cake, which can be pressed into a block and cut into sheets with more certainty in the result than were the strips used separately and with their surfaces partially dried out, and the sheets cut therefrom will be of uniform texture throughout and possess smooth finished surfaces.

I do not confine myself to the brushing of wood-alcohol over the strips for the purpose of restoring their lost solvents or for cementing them together, but wish it distinctly understood that this is but one of many methods of accomplishing the desired result, and is given herein merely for purposes of description. My invention consists, broadly, in restoring the strips, by whatever means or method accomplished, and in forming or cementing them into a solid mass or cake before they are formed into a block to be sheeted.

What I claim as my invention, and desire to secure by Letters Patent, is—

1. In the art of making pyroxyline material in imitation of ivory by cutting strips of material of varied color, welding them together to form a block, and reducing the block to sheets, the method of treating the strips to insure a perfect result, which consists in applying thereto a solvent to compensate for such evaporation of their moisture as may occur prior to their subjection to the action of the press.

2. The method hereinbefore described of producing sheets in imitation of ivory from pyroxyline material, which consists in, first, cutting strips composed of one or more thin pieces of material of varied color; second, treating the strips with a solvent and compacting them on edge into a cake; third, welding them together to form a block by heat and pressure; and, fourth, reducing the block to sheets.

3. The within-described process of producing sheets in imitation of ivory from pyroxyline material, which consists in treating strips of varied colors with a solvent, placing them on edge in face-to-face contact and applying pressure to insure the cementing of the strips into a solid mass, and finally subjecting them to the action of the press, whereby they are solidified into a block, from which sheets may be cut.

4. The method hereinbefore described of producing sheets in imitation of ivory from pyroxyline material, which consists in cutting strips of material of varied colors, cementing them together without the aid of heat, then solidifying them in a press, and finally reducing the block thus formed to sheets.

Signed at New York, in the county of New York and State of New York, this 4th day of April, A. D. 1884.

JOHN H. STEVENS.

Witnesses:
  CHAS. C. GILL,
  HERMAN GUSTOW.